United States Patent
Kim (10) Patent No.: US 11,962,049 B2
(45) Date of Patent: Apr. 16, 2024

(54) APPARATUS AND METHOD FOR CONTROLLING FUEL CELL SYSTEM

(71) Applicants: HYUNDAI MOTOR COMPANY, Seoul (KR); Kia Corporation, Seoul (KR)

(72) Inventor: Ji Tae Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 23 days.

(21) Appl. No.: 17/851,535

(22) Filed: Jun. 28, 2022

(65) Prior Publication Data

US 2023/0163333 A1  May 25, 2023

(30) Foreign Application Priority Data

Nov. 25, 2021   (KR) .......................... 10-2021-0164814

(51) Int. Cl.
*H01M 8/04858* (2016.01)
*H01M 8/04225* (2016.01)
(Continued)

(52) U.S. Cl.
CPC ..... *H01M 8/0494* (2013.01); *H01M 8/04225* (2016.02); *H01M 8/04228* (2016.02);
(Continued)

(58) Field of Classification Search
CPC ........... H01M 8/0494; H01M 8/04225; H01M 8/04228; H01M 8/04302; H01M 8/04303;
(Continued)

(56) References Cited

U.S. PATENT DOCUMENTS

| 6,777,909 B1 * | 8/2004 | Aberle ................... B60L 58/34 |
|---|---|---|
| | | 320/103 |
| 8,263,276 B1 | 9/2012 | Gurunathan et al. |
| (Continued) | | |

FOREIGN PATENT DOCUMENTS

| EP | 1 227 949 A1 | 8/2002 |
|---|---|---|
| KR | 10-0787245 B1 | 12/2007 |
| (Continued) | | |

OTHER PUBLICATIONS

Extended European Search Report issued in corresponding European Patent Application No. 22179586.7 dated Dec. 23, 2022.

*Primary Examiner* — Matthew W Van Oudenaren
(74) *Attorney, Agent, or Firm* — MORGAN, LEWIS & BOCKIUS LLP (57) ABSTRACT

An apparatus and a method for controlling a fuel cell system includes a fuel cell system including a fuel cell stack, a balance of plant for operating the fuel cell stack, and a fuel cell controller configured for controlling the BOP, a first power converter located between the fuel cell stack and a first voltage battery and including a bidirectional low voltage DC/DC converter, a second power located between the fuel cell stack and a second voltage battery to include a single bidirectional DC/DC converter module, and a controller configured for operating the first power converter or the single bidirectional DC/DC converter module of the second power converter, when the fuel cell system is started or stopped, and controlling the first power converter or the second power converter to supply driving power to the BOP using electrical energy of the first voltage battery or the second voltage battery.

14 Claims, 3 Drawing Sheets

(51) Int. Cl.
    *H01M 8/04228*     (2016.01)
    *H01M 8/04302*     (2016.01)
    *H01M 8/04303*     (2016.01)
    *H01M 8/0432*     (2016.01)
    *H01M 8/04746*     (2016.01)
    *H02M 3/335*     (2006.01)

(52) U.S. Cl.
    CPC ... *H01M 8/04302* (2016.02); *H01M 8/04303* (2016.02); *H01M 8/0432* (2013.01); *H01M 8/04753* (2013.01); *H02M 3/33569* (2013.01)

(58) Field of Classification Search
    CPC ........... H01M 8/0432; H01M 8/04753; H01M 16/006
    See application file for complete search history.

(56) References Cited

U.S. PATENT DOCUMENTS

| | | |
|---|---|---|
| 9,583,774 B2 | 2/2017 | Boegershausen et al. |
| 2006/0222909 A1 | 10/2006 | Aoyagi et al. |
| 2009/0008166 A1 | 1/2009 | Aoyagi et al. |
| 2010/0136379 A1* | 6/2010 | King .................. H02J 7/34 |
| | | 429/432 |
| 2020/0086732 A1 | 3/2020 | Bargman et al. |

FOREIGN PATENT DOCUMENTS

| | | |
|---|---|---|
| KR | 10-2010-0051511 A | 5/2010 |
| KR | 10-1234663 B1 | 2/2013 |
| KR | 10-2013-0084343 A | 7/2013 |
| KR | 10-2191146 B1 | 12/2020 |

* cited by examiner

APPARATUS AND METHOD FOR CONTROLLING FUEL CELL SYSTEM

CROSS-REFERENCE TO RELATED APPLICATION

The present application claims priority to Korean Patent Application No. 10-2021-0164814, filed on Nov. 25, 2021, the entire contents of which is incorporated herein for all purposes by this reference.

BACKGROUND OF THE PRESENT DISCLOSURE

Field of the Present Disclosure

The present disclosure relates to an apparatus and a method for controlling a fuel cell system to control the operation of the fuel cell system.

Description of Related Art

In fields such as power generation, ships and aviation, a large-capacity power generation system of Mega Watt (MW) or higher is required. To implement the large-capacity power generation system using a fuel cell system, a plurality of fuel cell systems may be connected to each other in series and/or in parallel to make up the large-capacity power generation system. However, when the plurality of fuel cell systems is connected to each other in series and/or in parallel to make up the large-capacity power generation system, an insulation resistance characteristic of a stack is degraded.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for controlling a fuel cell system to control power supply necessary for operation of a balance of plant (BOP) when the fuel cell system is started and stopped.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling a fuel cell system may include a fuel cell system including a fuel cell stack, a balance of plant (BOP) that operates the fuel cell stack, and a fuel cell controller that is configured to control the BOP, a first power converter located between the fuel cell stack and a first voltage battery and including a bidirectional low voltage DC/DC converter, a second power converter located between the fuel cell stack and a second voltage battery to include a single bidirectional DC/DC converter module, and a controller that operates the first power converter or the single bidirectional DC/DC converter module of the second power converter, when the fuel cell system is started or stopped, and controls the first power converter or the single bidirectional DC/DC converter module of the second power converter to supply driving power to the BOP using electrical energy of the first voltage battery or the second voltage battery, wherein an output voltage of the second voltage battery is higher than an output voltage of the first voltage battery.

The controller may operate the first power controller in a boost mode, when the fuel cell system is initially started.

The first power converter may boost and supply electrical energy stored in the first voltage battery to the BOP.

The controller may switch an operation mode of the first power converter from the boost mode to a buck mode, when the start of the fuel cell system is completed.

The first power converter may buck and supply electrical energy generated by the fuel cell stack to a load.

The second power converter may further include at least one unidirectional DC/DC converter module and a transformer. The controller may be configured to determine whether a current situation is a low temperature situation, when the fuel cell system is stopped, may stop a boost operation of the single bidirectional DC/DC converter module and the at least one unidirectional DC/DC converter module, when it is determined that the current situation is the low temperature situation, may operate the second voltage battery in a discharge mode, and may buck and supply electrical energy stored in the second voltage battery to the BOP using the single bidirectional DC/DC converter module.

The fuel cell controller may remove a material remaining in the fuel cell stack, when the current situation is not the low temperature situation or in the low temperature situation, and may control the BOP to block air and hydrogen supplied to the fuel cell stack.

According to another aspect of the present disclosure, a method for controlling a fuel cell system to control the fuel cell system including a fuel cell stack, an operation device, and a fuel cell controller may include starting, by a controller, a start procedure or a stop procedure of the fuel cell system, operating, by the controller, a first power converter including a bidirectional low voltage DC/DC converter or a single bidirectional DC/DC converter module of a second power converter based on starting the start procedure or the stop procedure, and supplying, by the first power converter or the single bidirectional DC/DC converter module of the second power converter, driving power to the BOP using electrical energy of a first voltage battery or a second voltage battery.

The operating of the first power converter or the second power converter may include operating, by the controller, the first power controller in a boost mode, when starting the start procedure.

The supplying of the driving power to the BOP may include boosting and supplying, by the first power converter, electrical energy stored in the first voltage battery to the BOP.

The method may further include switching, by the controller, an operation mode of the first power converter from the boost mode to a buck mode, when the start of the fuel cell system is completed, and bucking and supplying, by the first power converter, electrical energy generated by the fuel cell stack to a load.

The method may further include operating, by the controller, the single bidirectional DC/DC converter module and at least one unidirectional DC/DC converter module in the second power converter in the boost mode and boosting and outputting, by the single bidirectional DC/DC converter module and the at least one unidirectional DC/DC converter module, electrical energy generated by the fuel cell stack.

The operating of the first power converter or the second power converter may include determining, by the controller, whether a current situation is a low temperature situation, when starting the stop procedure, stopping, by the controller, a boost operation of the single bidirectional DC/DC converter module and at least one unidirectional DC/DC converter module in the second power converter, when it is determined that the current situation is the low temperature situation, operating, by the controller, the second voltage battery in a discharge mode, initiating, by the controller, a buck operation of the single bidirectional DC/DC converter module, bucking and supplying, by the single bidirectional DC/DC converter module, electrical energy stored in the second voltage battery to the BOP, and removing, by the BOP, a material remaining in the fuel cell stack under control of the fuel cell controller.

The method may further include controlling, by the fuel cell controller, the BOP to block air and hydrogen supplied to the fuel cell stack, after removing the material remaining in the fuel cell stack, when the current situation is not the low temperature situation or in the low temperature situation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
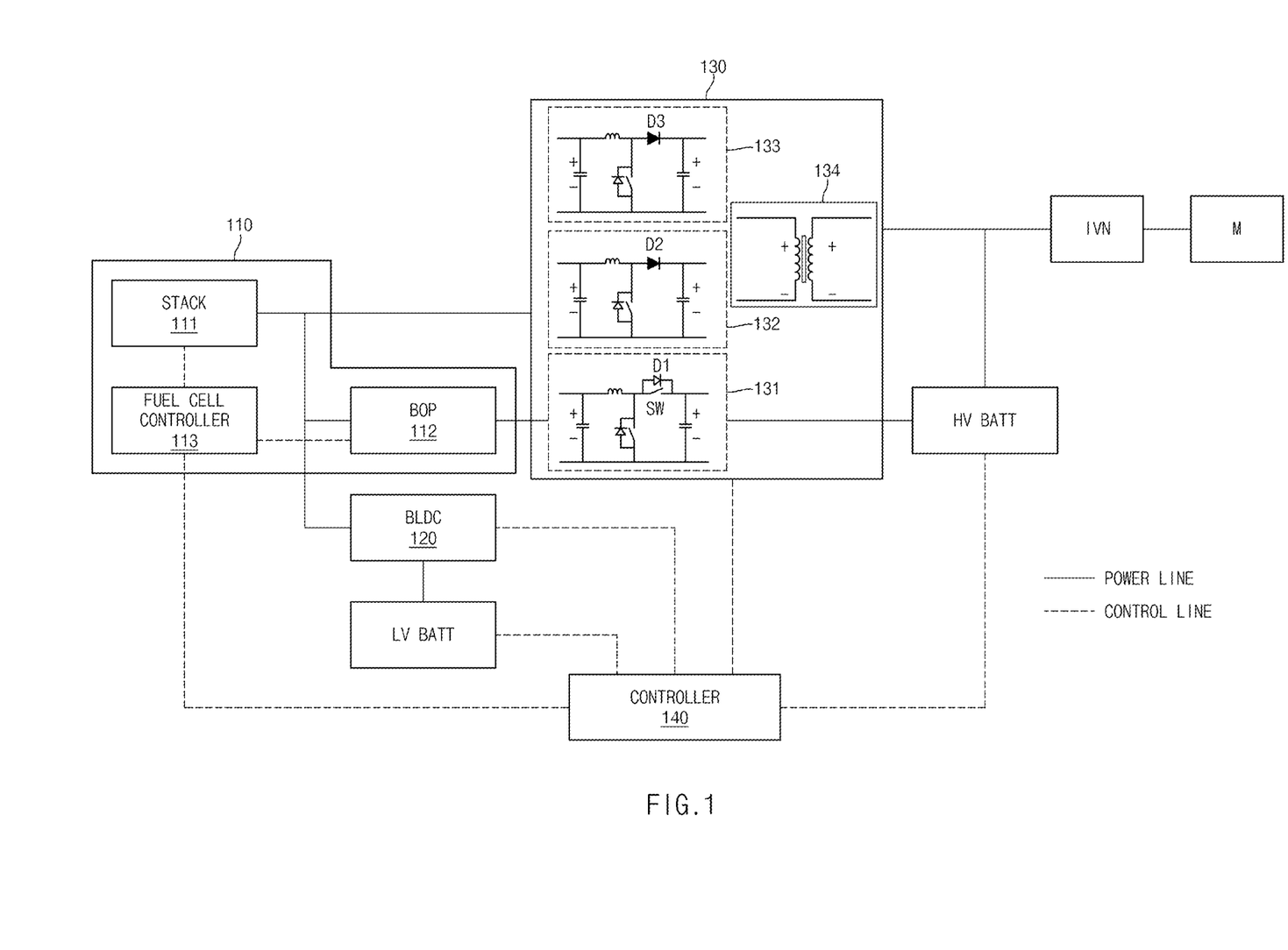
FIG. 1 is a block diagram illustrating a configuration of an apparatus of controlling a fuel cell system according to various exemplary embodiments of the present disclosure.

FIG. 1 is a block diagram illustrating a configuration of an apparatus of controlling a fuel cell system according to various exemplary embodiments of the present disclosure.

The apparatus of controlling the fuel cell system may be mounted on an electrical system (e.g., a ship control system, a train control system, an aviation control system, a large-capacity power generation system, and the like) which operates using electrical energy (power) generated by a fuel cell system 110. The apparatus of controlling the fuel cell system may control start, run, stop or shutdown, and the like of the fuel cell system 110.

Referring to FIG. 1, the apparatus of controlling the fuel cell system may include the fuel cell system 110, a first power converter 120, a second power converter 130, a controller 140, and the like.

The fuel cell system 110 may include a fuel cell stack (hereinafter, referred to as a "stack") 111, a balance of plant (BOP) 112, a fuel cell controller 113, and the like.

The stack 111 may produce electrical energy (i.e., power) by an electrochemical reaction between hydrogen and oxygen. The stack 111 may include two catalyst electrodes, that is, an anode and a cathode. When hydrogen and oxygen are respectively provided to the anode and the cathode, the anode may divide the hydrogen into protons, that is, hydrogen ions and electrons. The hydrogen ions may move to the cathode through an electrolyte layer and may be combined with oxygen in the cathode to produce water ($H_2O$). Electrons pass through an external circuit to generate current.

The BOP 112 may be subsystems necessary to operate the stack 111, which may be mounted on the periphery of the stack 111. The BOP 112 may directly receive electrical energy produced by the stack 111 or may receive electrical energy stored in a low voltage battery LV BATT to operate. Such a BOP 112 may include an air process system (APS), a fuel process system (FPS), a thermal management system (TMS), and the like. The APS may be a system which supplies air (i.e., oxygen) to react with hydrogen to the stack 111, which may include an air cleaner, an air blower or an air compressor, and the like. The FPS may be a system which supplies hydrogen, which may include a hydrogen tank, a pressure regulator, a hydrogen recirculator, and the like. The TMS may be a system which manages heat generated due to an electrochemical reaction in the stack 111 to allow the stack 111 to maintain a suitable temperature, which may include a radiator, a water pump, an ion filter, a water tank, and the like.

The fuel cell controller 113 may control the overall operation of the fuel cell system 110. The fuel cell controller 113 may include at least one processor and may include a memory located inside and/or outside the fuel cell controller 113. The memory may be a non-transitory storage medium which stores instructions executed by the at least one processor. The memory may be implemented as at least one of storage media such as a hard disk, a solid state disk (SSD), an embedded multimedia card (eMMC), and/or a universal flash storage (UFS). The at least one processor may be implemented as at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

The fuel cell controller 113 may control the BOP 112 to supply or block fuel (i.e., hydrogen) and/or air to the stack 111. Furthermore, the fuel cell controller 113 may control the BOP 112 to adjust the amount of hydrogen and/or air supplied to the stack 111. The fuel cell controller 113 may monitor state(s) of the stack 111 and/or the BOP 112 using various detectors (e.g., a temperature detector, a voltage detector, a current detector, a flow detector, and/or the like) provided in the stack 111 and/or the BOP 112.

The first power converter 120 may supply power to the BOP 112 and/or a low voltage load using electrical energy stored in the low voltage battery LV BATT (e.g., a 12V battery). At the instant time, the low voltage battery LV BATT may operate in a discharge mode. The first power converter 120 may operate in a boost mode or a buck mode. When operating in the boost mode, the first power converter 120 may convert electrical energy stored in the low voltage battery LV BATT into a high voltage and may supply the high voltage to the BOP 112. When operating in the buck mode, the first power converter 120 may convert electrical energy stored in the low voltage battery LV BATT into a low voltage and may supply the low voltage to a low voltage load loaded into an electrical system.

The first power converter 120 may charge the low voltage battery LV BATT using electrical energy produced by the stack 111 of the fuel cell system 110. At the instant time, the low voltage battery LV BATT may operate in a charge mode. When the low voltage battery LV BATT operates in the charge mode, the first power converter 120 may operate in the buck mode to convert high voltage electrical energy output from the stack 111 into low voltage electrical energy and store the low voltage electrical energy in the low voltage battery LV BATT. Furthermore, the first power converter 120 may operate in the buck mode to convert high voltage electrical energy output from the stack 111 into low voltage electrical energy and supply the low voltage electrical energy to the low voltage load in the electrical system.

The first power converter 120 may be implemented as a bidirectional low voltage direct current (DC)/DC converter (BLDC). When the fuel cell system 110 is initially started (or activated), the first power converter 120 may supply driving power to the BOP 112 using electrical energy stored in the low voltage battery LV BATT. After the start of the fuel cell system 110 is completed, the first power converter 120 may supply driving power to a low voltage electronic part (e.g., a 12V electronic part) using electrical energy stored in the low voltage battery LV BATT.

The second power converter 130 may convert electrical energy output from the stack 111 into high voltage electrical energy and may output the high voltage electrical energy. The second power converter 130 may deliver (or supply) the converted high voltage electrical energy to a high voltage battery HV BATT (e.g., a battery over hundreds of volts) or may supply the converted high voltage electrical energy to a motor M through an inverter IVN.

The second power converter 130 may be an insulated DC/DC converter, which may include at least one bidirectional DC/DC converter module 131, at least one unidirectional DC/DC converter module 132 and 133, a transformer 134, and the like. The bidirectional DC/DC converter module 131 may include a bidirectional DC/DC converter circuit to operate in the boost mode or the buck mode. The unidirectional DC/DC converter modules 132 and 133 may be connected to each other in series and/or in parallel. Each of the unidirectional DC/DC converter modules 132 and 133 may include a boost DC/DC converter circuit to operate in the boost mode. Because a diode D1 and a switch SW are configured as a pair in a capacitor at an output of the bidirectional DC/DC converter module 131, electrical energy may flow bidirectionally. As one diode D2 or D3 is connected to a capacitor at an output of the unidirectional DC/DC converter module 132 or 133 in series, electrical energy may flow unidirectionally. The number of DC/DC converter modules 131 to 133 in the second power converter 130 may be proportional to a power capacity of the fuel cell system 110.

The controller 140 may control the overall operation of the electrical system including the fuel cell system 110. The controller 140 may include at least one processor and may include a memory located inside and/or outside the controller 140. The memory may be a storage medium which stores instructions executed by the at least one processor. The memory may be implemented as at least one of storage media such as a hard disk, an SSD, an eMMC, and/or a UFS. The at least one processor may be implemented as at least one of processing devices such as an ASIC, a DSP, PLD, an FPGA, a CPU, microcontrollers, and/or microprocessors.

When the electrical system is started or stopped, the controller 140 may perform a start or stop (shutdown) procedure of the fuel cell system 110. When detecting the start and stop of the electrical system, the controller 140 may transmit a start command or a stop command to the fuel cell system 110.

When receiving a response to the start command from the fuel cell controller 113, the controller 140 may switch an operation mode of the first power converter 120 to the boost mode to operate the first power converter 120. As the first power converter 120 operates in the boost mode, the fuel cell system 110 may start the BOP 112 using electrical energy of the low voltage battery LV BATT to activate the stack 111. The BOP 112 may supply air and hydrogen to the stack 111 to initiate warm-up of the stack 111.

The controller 140 may recognize that the start of the fuel cell system 110 is completed. In other words, when the warm-up of the stack 111 is completed, the controller 140 may determine that the start of the fuel cell system 110 is completed. The controller 140 may receive information indicating whether the warm-up of the stack 111 is completed from the fuel cell controller 113.

When the start of the fuel cell system 110 is completed, the controller 140 may switch the operation mode of the first power converter 120 from the boost mode to the buck mode.

As the first power converter 120 transitions to the buck mode, it may charge the low voltage battery LV BATT using electrical energy output from the stack 111 or may supply driving power to a 12V electronic part.

When the start of the fuel cell system 110 is completed, the controller 140 may operate the second power converter 130 in the boost mode to supply driving power to the electrical system using electrical energy generated by the fuel cell system 110. After the fuel cell system 110 is activated, the controller 140 may control the second power converter 130 to boost and supply electrical energy generated by the fuel cell system 110 to the electrical system.

When receiving a response (e.g., an acknowledge character (ACK)) to the stop command from the fuel cell controller 113, the controller 140 may determine whether the fuel cell system 110 is stopped in a low temperature situation based on the received response. The fuel cell controller 113 may measure an external temperature using a temperature detector. When the measured external temperature is less than a predefined threshold temperature, the fuel cell controller 113 may determine a current situation as a low temperature situation. When transmitting a response message (or an ACK message) for the stop command of the controller 140, the fuel cell controller 113 may transmit the result of determining the low temperature situation together.

When the current situation is the low temperature situation, the controller 140 may stop the fuel cell system 110 depending on a low temperature shutdown procedure. The controller 140 may stop the operation of the fuel cell system 110 using the boost mode of the at least one unidirectional DC/DC converter module 132 and 133 in the second power converter 130. Furthermore, the controller 140 may stop the output of the stack 111.

The controller 140 may operate the high voltage battery HV BATT in the discharge mode and may switch the operation mode of the single bidirectional DC/DC converter module 131 in the second power converter 130 from the boost mode to the buck mode. The controller 140 may control the bidirectional DC/DC converter module 131 to supply power to the BOP 112 using electrical energy stored in the high voltage battery HV BATT. The controller 140 may control the fuel cell controller 113 to operate the BOP 112 to remove a material remaining in the stack 111. The fuel cell controller 113 may control the BOP 112 to block air and hydrogen supplied to the stack 111 depending on an instruction of the controller 140.

When the stop of the fuel cell system 110 is completed, the controller 140 may complete the stop of the electrical system. When the removal of the material remaining in the stack 111 is completed, the fuel cell system 110 may determine that its stop is completed and may transmit a message indicating that the stop of the fuel cell system 110 is completed to the controller 140. The controller 140 may determine that the stop of the fuel cell system 110 is completed by the message received from the fuel cell system 110.

Figure 2:
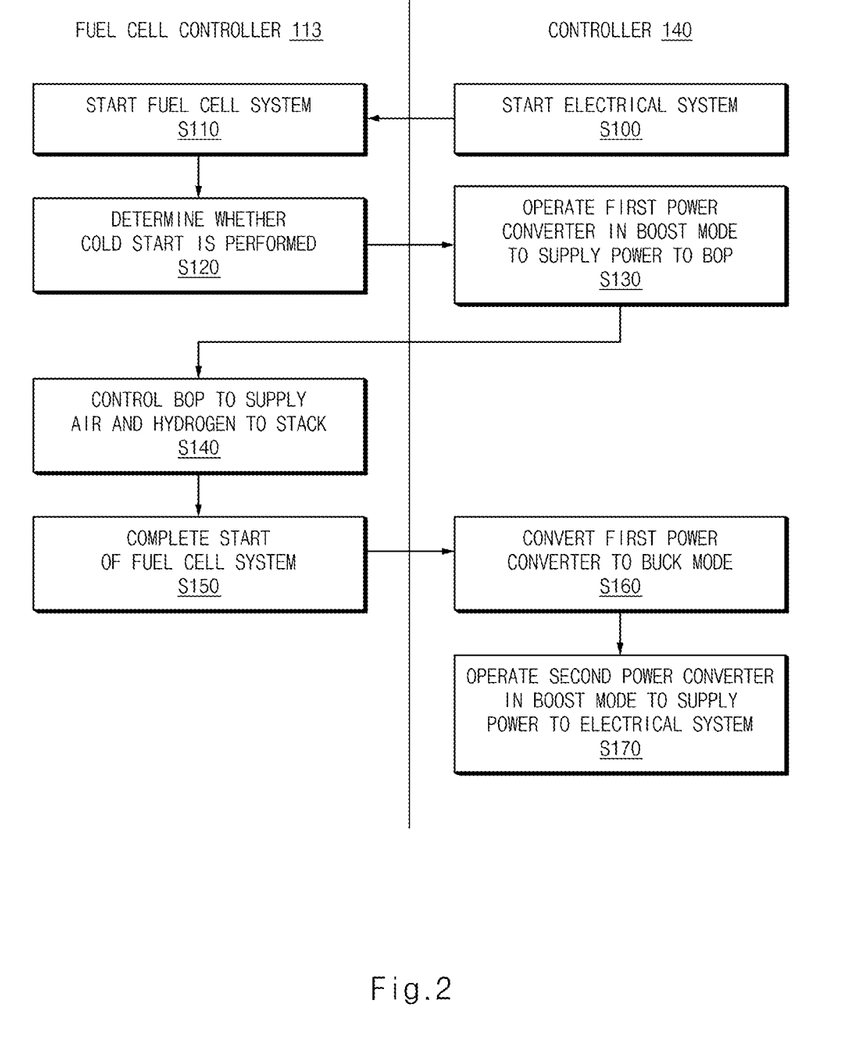
FIG. 2 is a flowchart illustrating a method for controlling a start of a fuel cell system according to an exemplary embodiment of the present disclosure.

FIG. 2 is a flowchart illustrating a method for controlling a start of a fuel cell system according to an exemplary embodiment of the present disclosure.

Referring to FIG. 2, in S100, a controller 140 of FIG. 1 may start an electrical system. When detecting a start event generated outside or inside the electrical system, the controller 140 may start the electrical system. The controller 140 may transmit a message (or a signal) indicating the start of the electrical system to a fuel cell system 110 of FIG. 1.

When the electrical system is started, in S110, a fuel cell controller 113 of the fuel cell system 110 may start the fuel cell system 110. The fuel cell controller 113 may start a start procedure of the fuel cell system 110 depending on an instruction of the controller 140.

In S120, the fuel cell controller 113 may determine whether cold start of fuel cell system 110 is performed. When the determination of whether the cold start is performed is completed, the fuel cell controller 113 may transmit a message (or a signal) for providing a notification of it to the controller 140.

In S130, the controller 140 may operate a first power converter 120 of FIG. 1 in a boost mode to supply power to a BOP 112 of FIG. 1. The first power converter 120 may boost and supply electrical energy stored in a low voltage battery LV BATT of FIG. 1 to the BOP 112. The first power converter 120 may be implemented as a bidirectional low voltage DC/DC converter.

In S140, the fuel cell controller 113 may control the BOP 112 under an instruction of the controller 140 to supply air and hydrogen to a stack 111 of FIG. 1. When power is supplied to the BOP 112, the controller 140 may instruct the fuel cell controller 113 to supply air and hydrogen. The fuel cell controller 113 may control the BOP 112 to supply air and hydrogen to the stack 111. The stack 111 my start warm-up using the air and hydrogen.

In S150, the fuel cell controller 113 may complete the start of the fuel cell system 110. When the warm-up of the stack 111 is completed, the fuel cell controller 113 may determine that the start of the fuel cell system 110 is completed. The fuel cell controller 113 may transmit a message indicating that the start of the fuel cell system 110 is completed to the controller 140.

When the start of the fuel cell system 110 is completed, in S160, the controller 140 may switch the operation mode of the first power converter 120 from the boost mode to a buck mode. When the operation mode switches to the buck mode, the first power converter 120 may charge the low voltage battery LV BATT using electrical energy output from the stack 111 or may supply driving power to a low voltage load in the electrical system.

In S170, the controller 140 may operate a second power converter 130 of FIG. 1 in the boost mode to supply power to the electrical system. The second power converter 130 may boost and supply electrical energy output from the stack 111 to the electrical system.

According to the above-mentioned embodiment, when the fuel cell system 110 is initially started, it needs to supply power to the BOP 112 to activate the stack 111. At the instant time, because it is unable for an apparatus of controlling a fuel cell system to use electrical energy stored in a high voltage battery HV BATT of FIG. 1, the apparatus of controlling the fuel cell system may operate the BOP 112 using electrical energy stored in the low voltage battery LV BATT and may proceed with activating the stack 111.

Figure 3:
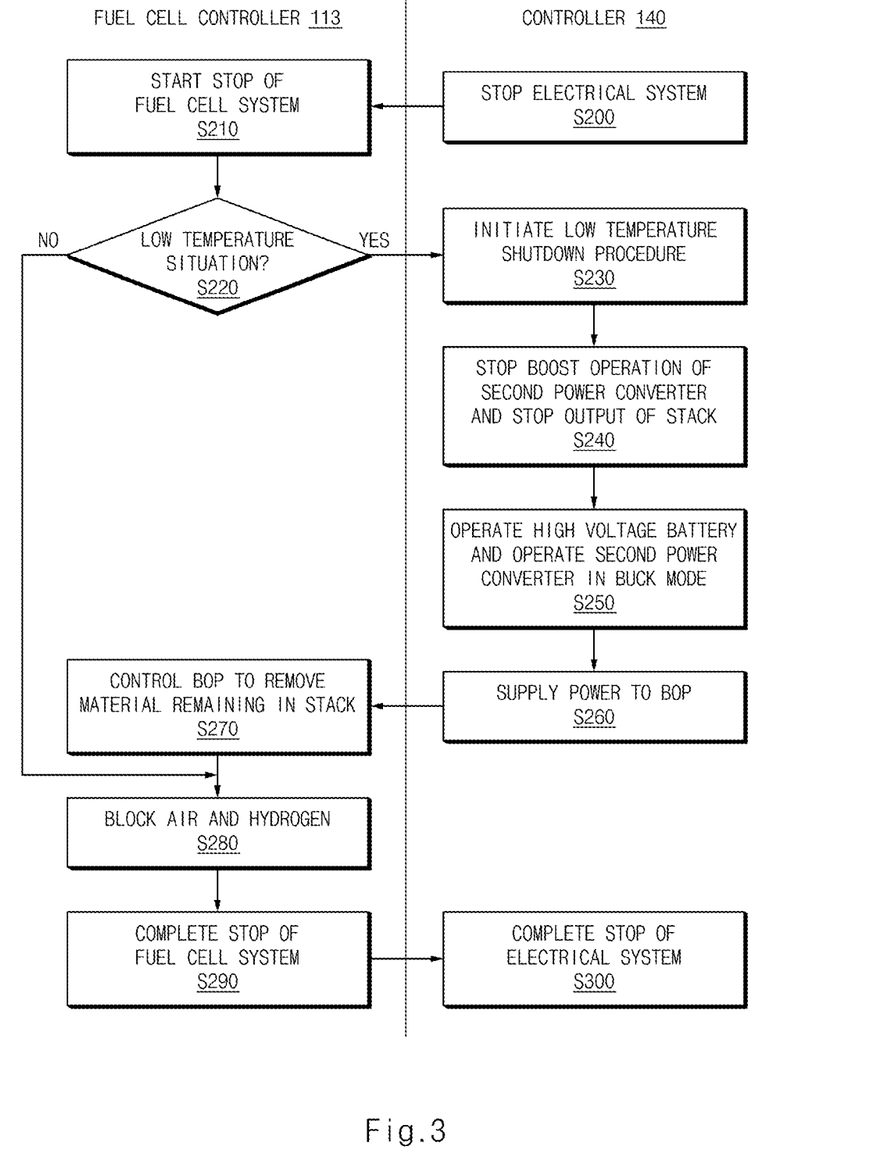
FIG. 3 is a flowchart illustrating a method for controlling stop of a fuel cell system according to another exemplary embodiment of the present disclosure.

FIG. 3 is a flowchart illustrating a method for controlling stop of a fuel cell system according to another exemplary embodiment of the present disclosure.

In S200, a controller 140 of FIG. 1 may stop the operation of an electrical system. When detecting a stop event generated outside or inside the electrical system, the controller 140 may stop (shut down) the electrical system. The controller 140 may transmit a message indicating the stop of the electrical system to a fuel cell controller 113 of a fuel cell system 110 of FIG. 1.

In S210, the fuel cell controller 113 may start a stop procedure of the fuel cell system 110. The fuel cell controller 113 may start the stop procedure under an instruction of the controller 140.

In S220, the fuel cell controller 113 may determine whether a current situation is a low temperature situation. The fuel cell controller 113 may transmit the result of determining whether the current situation is the low temperature situation to the controller 140. The fuel cell controller 113 may measure an external temperature by a temperature detector. When the measured external temperature is less than a predefined threshold temperature, the fuel cell controller 113 may determine the current situation as the low temperature situation.

When it is determined that the current situation is the low temperature situation, in S230, the controller 140 may initiate a low temperature shutdown procedure. The controller 140 may determine whether the current situation is the low temperature situation based on the result received from the fuel cell controller 113. When the stop of the fuel cell system 110 is started in the low temperature situation, the controller 140 my stop (shut down) the fuel cell system 110 depending on a predetermined low temperature shutdown procedure.

In S240, the controller 140 may stop a boost operation of a second power converter 130 of FIG. 1 and an output of a stack 111 of FIG. 1. The controller 140 may stop operating a plurality of DC/DC converter module 131 and 133 in the second power converter 130 in a boost mode. Furthermore, the controller 140 may request the fuel cell controller 113 to stop the output of the stack 111.

Thereafter, in S250, the controller 140 may operate a high voltage battery HV BATT of FIG. 1 and may switch the operation mode of the second power converter 130 from the boost mode to a buck mode. The controller 140 may switch the operation mode of the single bidirectional DC/DC converter module 131 in the second power converter 130 from the boost mode to the buck mode.

In S260, the controller 140 may supply power to a BOP 112 of FIG. 1 using the second power converter 130. The single bidirectional DC/DC converter module 131 of the second power converter 130 may supply driving power to the BOP 112 using electrical energy of the high voltage battery HV BATT.

In S270, the fuel cell controller 113 may control the BOP 112 to remove materials remaining in the stack 111. When power is supplied to the BOP 112, the fuel cell controller 113 may control the BOP 112 to remove a material remaining in the stack 111.

In S280, the fuel cell controller 113 may block air and hydrogen supplied to the stack 111. The fuel cell controller 113 may control the operation of the BOP 112 to block air and hydrogen supplied to the stack 111.

In S290, the fuel cell controller 113 may determine that the stop of the fuel cell system 110 is completed. When the material remaining in the stack 111 is removed and when air and hydrogen supply to the stack 111 is stopped, the fuel cell controller 113 may determine that the generation of the stack 111 is stopped to determine that the stop of the fuel cell system 110 is completed.

When the stop of the fuel cell system 110 is completed, in S300, the controller 140 may complete the stop of the electrical system.

When the current situation is not the low temperature situation in S220, in S280 and S290, the fuel cell controller 113 may control the BOP 112 to block air and hydrogen supplied to the stack 111 and stop the fuel cell system 110. As the fuel cell system 110 is stopped, the controller 140 may stop the electrical system.

According to the above-mentioned embodiment, as one of multiple unidirectional DC/DC converter modules making up the second power converter 130 is designed to change to the bidirectional DC/DC converter module 131 using the configuration of the second power converter 130 previously including multiple modules, power may be supplied to the BOP 112 using the bidirectional DC/DC converter module 131 when the fuel cell system 110 is stopped in a low temperature. As a result, power may be supplied to the BOP 112 using electrical energy stored in the high voltage battery HV BATT, when the fuel cell system 110 is stopped in a low temperature interval, without adding a separate converter or changing the entire converter circuit and control logic.

According to various exemplary embodiments of the present disclosure, the apparatus of controlling the fuel cell system may supply necessary power to the BOP using a bidirectional low voltage converter when the fuel cell system is started and may supply power to the BOP using a single bidirectional converter in an insulated converter when the fuel cell system is stopped, thus improving a problem in which an insulation resistance characteristic of the stack is degraded.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling a fuel cell system, the apparatus comprising:
a fuel cell system including a fuel cell stack, a balance of plant (BOP) configured to operate the fuel cell stack, and a fuel cell controller configured to control the BOP;
a first power converter located between the fuel cell stack and a first voltage battery and including a bidirectional DC/DC converter;
a second power converter located between the fuel cell stack and a second voltage battery and including a single bidirectional DC/DC converter module; and
a controller configured to operate the first power converter or the single bidirectional DC/DC converter module of the second power converter, when the fuel cell system is started or stopped, and configured to control the first power converter or the single bidirectional DC/DC converter module of the second power converter to supply driving power to the BOP using electrical energy of the first voltage battery or the second voltage battery,
wherein an output voltage of the second voltage battery is higher than an output voltage of the first voltage battery.

2. The apparatus of claim 1, wherein the controller is configured to operate the first power converter in a boost mode, when the fuel cell system is initially started.

3. The apparatus of claim 2, wherein the first power converter is configured to boost and supply electrical energy stored in the first voltage battery to the BOP.

4. The apparatus of claim 2, wherein the controller is configured to switch an operation mode of the first power converter from the boost mode to a buck mode, when a start of the fuel cell system is completed.

5. The apparatus of claim 4, wherein the first power converter is configured to buck and supply electrical energy generated by the fuel cell stack to a load.

6. The apparatus of claim 1,
wherein the second power converter further includes at least one unidirectional DC/DC converter module and a transformer, and
wherein the controller is configured to determine whether a current situation is a low temperature situation, when the fuel cell system is stopped,
wherein when the controller concludes that the current situation is the low temperature situation, the controller is configured:
to stop a boost operation of the single bidirectional DC/DC converter module and the at least one unidirectional DC/DC converter module,
to operate the second voltage battery in a discharge mode, and
to buck and supply electrical energy stored in the second voltage battery to the BOP using the single bidirectional DC/DC converter module,
wherein the low temperature situation is when an external temperature is less than a predefined threshold temperature.

7. The apparatus of claim 6, wherein the fuel cell controller is configured to control the BOP to block air and hydrogen supplied to the fuel cell stack when the current situation is not the low temperature situation or when a material remaining in the fuel cell stack is removed in the low temperature situation.

8. A method for controlling a fuel cell system including a fuel cell stack, a balance of plant (BOP), and a fuel cell controller, the method including:
starting, by a controller, a start procedure or a stop procedure of the fuel cell system;
operating, by the controller, a first power converter including a bidirectional DC/DC converter or a second power converter including a single bidirectional DC/DC converter module according to starting the start procedure or the stop procedure; and
supplying, by the first power converter or the single bidirectional DC/DC converter module of the second power converter, driving power to the BOP using electrical energy of a first voltage battery or a second voltage battery,
wherein an output voltage of the second voltage battery is higher than an output voltage of the first voltage battery.

9. The method of claim 8, wherein the operating of the first power converter or the second power converter includes:
operating, by the controller, the first power converter in a boost mode, when starting the start procedure.

10. The method of claim 9, wherein the supplying of the driving power to the BOP includes:
boosting and supplying, by the first power converter, electrical energy stored in the first voltage battery to the BOP.

11. The method of claim 10, further including:
switching, by the controller, an operation mode of the first power converter from the boost mode to a buck mode, when a start of the fuel cell system is completed; and
bucking and supplying, by the first power converter, electrical energy generated by the fuel cell stack to a load.

12. The method of claim 11, further including:
operating, by the controller, the single bidirectional DC/DC converter module and at least one unidirectional DC/DC converter module in the second power converter in the boost mode; and
boosting and outputting, by the single bidirectional DC/DC converter module and the at least one unidirectional DC/DC converter module, electrical energy generated by the fuel cell stack.

13. The method of claim 8, wherein the operating of the first power converter or the second power converter includes:
determining, by the controller, whether a current situation is a low temperature situation, when starting the stop procedure;
stopping, by the controller, a boost operation of the single bidirectional DC/DC converter module and at least one unidirectional DC/DC converter module in the second power converter, when the controller concludes that the current situation is the low temperature situation;
operating, by the controller, the second voltage battery in a discharge mode;
initiating, by the controller, a buck operation of the single bidirectional DC/DC converter module;

bucking and supplying, by the single bidirectional DC/DC converter module, electrical energy stored in the second voltage battery to the BOP; and removing, by the BOP, a material remaining in the fuel cell stack under control of the fuel cell controller, wherein the low temperature situation is when an external temperature is less than a predefined threshold temperature.

14. The method of claim 13, further including:

controlling, by the fuel cell controller, the BOP to block air and hydrogen supplied to the fuel cell stack when the current situation is not the low temperature situation or when the material remaining in the fuel cell stack is removed in the low temperature situation.

* * * * *